United States Patent Office 3,646,209
Patented Feb. 29, 1972

3,646,209
PHARMACEUTICAL METHODS AND COMPOSITIONS UTILIZING 2-ALKANOYL OR AROYL-3-AMINOALKOXYINDOLES
Arne Elof Brandstrom, Goteborg, and Stig Ake Ingemar Carlsson, Molnlycke, Sweden, and Andre Gagneux, Basel, Switzerland, assignors to Geigy Chemical Corporation, Ardsley, N.Y.
No Drawing. Original application Jan. 22, 1968, Ser. No. 699,289, now Patent No. 3,509,163, dated Apr. 28, 1970. Divided and this application Sept. 26, 1969, Ser. No. 870,727
Int. Cl. A61k 27/00
U.S. Cl. 424—274    22 Claims

ABSTRACT OF THE DISCLOSURE

The compounds are of the class of indole derivatives, more particularly indole derivatives substituted in 2- and 3-positions and acid addition salts thereof. The compounds are useful as analgesic, anti-inflammatory, anti-tussive, tranquilizing, anti-allergic and anaestesia-potentiating agents. An illustrative embodiment is 2-benzoyl-3-(2-pyrrolidinoethoxy)indole.

---

This is a division of Ser. No. 699,289 filed Jan. 22, 1968, now U.S. Pat. No. 3,509,163.

DETAILED DISCLOSURE

The present invention concerns new indole derivatives having valuable pharmacological properties, their pharmaceutically acceptable salts with inorganic and organic acids, and processes for the production of these new indole derivatives.

It has been found that new indole derivatives of the general formula

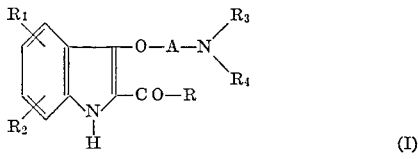

wherein

R represents lower alkyl or phenyl which can be substituted by lower alkyl, lower alkoxy, or halogen particularly chlorine, bromine, and fluorine;
$R_1$ and $R_2$ independently of each other represent hydrogen, lower alkyl, lower alkoxy or lower alkanoyloxy, phenylalkoxy having at most 9 carbon atoms, fluorine, chlorine, bromine or hydroxy, or $R_1$ and $R_2$ taken together represent methylenedioxy,
A represents alkylene having not more than 4 carbon atoms, and
$R_3$ and $R_4$ each represent lower alkyl or, as —$NR_3R_4$ they represent pyrrolidino, piperidino, hexamethyleneimino, morpholino, lower dialkyl morpholino or tetrahydropyridino, and acid addition salts thereof;

have valuble pharmacological properties, in particular analgesic, anti-inflammatory, as well as anti-tussive, tranquilising, anti-allergic, anti-oedematous, adrenolytic and anaesthesia-potentiating activity. At the same time they have relatively slight toxicity and are thus suitable as active substances in pharmaceutical preparations for the relief and removal of painful conditions, for the treatment of inflammation, peripheral disturbances of the circulation, tussive irritation, certain metal disorders which are accessible to treatment with tranquilizers as well as anaesthesia potentiation.

Furthermore, the present invention relates to novel methods and compositions containing a compound of the above-mentioned formula for effecting analgesic, anti-inflammatory, anti-tussive, tranquilizing, anti-allergic, anti-oedematous, adrenolylic, and anaesthesia-potentiating activities in warm-blooded animals, especially mammals. More particularly, the method of effecting analgesic, anti-inflammatory, anti-tussive, tranquilizing, anti-allergic, anti-oedematous, adrenolgesic, and anaesthesia-potentiating activities in mammals is concerned with administering a compound as defined in the above formula in therapeutic doses.

According to this invention the scope of the substituents as defined in the above-mentioned formula may be characterized as follows:

The term "lower alkyl" as used herein alone or in "lower alkoxy," "lower alkanoyloxy" and "phenylalkoxy" means straight or branched alkyl chains of the general formula $C_mH_{2m+1}$ wherein $m$ represents an integer of up to 5 carbon atoms. Illustrative of such alkyl groups are methyl, ethyl, propyl, isopropyl, butyl, and the like; illustrative of alkoxy groups are methoxy, ethoxy, propoxy, iso-propoxy, butoxy, iso-butoxy, amyloxy, iso-amyloxy, and the like; illustrative embodiments of alkanoyloxy are acetoxy, propionoxy, butyroxy, and the like; illustrative embodiments of phenylalkoxy are phenylmethoxy, phenylethoxy, phenylpropoxy and the like.

The term "alkylene' stands for straight or branched alkylene chains of up to 4 carbon atoms. Illustrative embodiments of alkylene are methylene, ethylene, propylene (1,3), butylene (1,4), propylene (1,2), 2-methyl propylene (1,3) and the like.

In the general Formula I, for example:

A can represent a radical of the formula —$CH_2$—$CH_2$—,
—$CH_2$—$CH_2$—$CH_2$—, —$CH(CH_3)$—$CH_2$— or
—$CH(CH_3)$—$CH(CH_3)$—

R can represent the methyl, ethyl, n-propyl, isopropyl, n-butyl, isobutyl, n-amyl, phenyl, o-tolyl, m-tolyl, p-tolyl, 2,4-dimethylphenyl, 2-chloro-4-methylphenyl, o-methoxyphenyl, m-methoxyphenyl, p-methoxyphenyl, o-ethoxyphenyl, m-ethoxyphenyl, p-ethoxyphenyl, 3,4-methylenedioxyphenyl, p-n-propoxyphenyl, p-isopropoxyphenyl, p-n-butoxyphenyl, o-chlorophenyl, m-chlorophenyl, p-chlorophenyl, o-bromophenyl, m-bromophenyl, p-bromophenyl, o-fluorophenyl or p-fluorophenyl group;

$R_1$ and $R_2$ can represent hydrogen, methyl, ethyl, n-propyl, isopropyl, n-butyl, isobutyl, n-amyl, methoxy, ethoxy, n-propoxy, isopropoxy, n-butoxy, acetoxy, propionoxy, butyroxy, isobutyroxy, benzyloxy, phenylethoxy, phenyl-(n)-propoxy or hydroxy groups, fluorine, chlorine or bromine and, together they can represent the methylenedioxy group;

$R_3$ and $R_4$ independently of each other can represent the methyl, ethyl, n-propyl, isopropyl, n-butyl, isobutyl or n-amyl group and —$NR_3R_4$ can represent the pyrrolidino, piperidino, hexamethyleneimino, morpholino, 2,6-dimethyl-morpholino or a tetrahydropyridino group.

The compounds utilized in the present invention can be prepared in accordance with the methods described in U.S. Pat. No. 3,509,163, the disclosure of which is hereby incorporated by reference.

The compounds of the above-described general Formula I and their physiolgically tolerable acid addition salts possess valuable pharmacological and therapeutic properties and may be used in the form of pharmaceutical compositions, especially as analgesic, anti-inflammatory, anti-tussive, tranquilizing, anti-allergic, anti-oedematous, adrenolytic, and anaesthesia-potentiating agents in warm-blooded animals, particularly mammals.

The toxicity of the compounds of the instant invention is low: for instance, the $LD_{50}$ of 2-benzoyl-3-(2-pyrrolidinoethoxy)indole hydrochloride administered orally to rats is higher than 120 mg./kg. and higher than 15 mg./kg. on intravenous administration to mice.

The anti-inflammatory activity of the compounds of the above-mentioned general formula is illustratively demonstrated by the following test:

Into each member of a group of 20 rats weighing between 120 and 160 g. are injected intraperitoneally different doses of 2-benzoyl-3-(2-pyrrolidinoethoxy)indole hydrochloride. Five minutes later 0.1 ml. of a 0.05% aqueous solution of serotonin-greatininsulfate is injected into one hind paw of each of the test animals. The animals are sacrificed two hours after serotonin administration and the extent of the swelling is determined by measuring the weight differences of the paws treated with serotonin solution and the untreated paws.

A control group of 20 rats having not obtained the test compound but having been treated with serotonin like the test rats is also sacrificed after two hours and the extent of swelling determined. The change of the average weight difference of the hind paws of the first group versus the average weight difference of the hind paws of the control group is expressed in percent over control. The results are given in the following table.

|  | Number of rats treated | Dosages, mg./kg. | Reduction of swelling in percent |
|---|---|---|---|
| Control | 20 | 0 | — |
|  |  | 0 | — |
|  |  | 0 | — |
| 2-benzoyl-3-(2-pyrrolidinoethoxy)-indole hydrochloride. | 20 | 2 | More than −30. |
|  | 20 | 5 | More than −60. |
|  | 20 | 10 | More than −70. |
|  | 20 | 25 | More than −90. |

The analgesic activity of 2-benzoyl-3-(2-pyrrolidinoethoxy)-5,6-methylenedioxy indole hydrochloride was determined on white mice according to the method of A. Gross described in Arch. exp. Path. and Pharmacologie 229, 400 (1956); also described by F. E. D'Amour and D. L. Smith in J. Pharmacol. Exptl. Therap. 72, 74 (1944) and by W. B. Bass and N. J. Vander-Brook in J. Am. Pharm. Assoc. (Sci. Ed.) 41, 509 (1952), with the apparatus according to Friebel and Reichle. According to this method, it was shown that dosages of 25 to 100 mg./kg. p.o. have a significant analgesic activity.

In another test for analgesic activity, i.e. a test wherein a suspension of phenylquinone is injected to mice to cause pain, 39 mg./kg. of 2-benzoyl-3-(2-pyrrolidinoethoxy)-5,6-methylenedioxy indole hydrochloride was an effective dosage to show analgetic activity on oral administration to mice.

The anti-tussive activity of 2-benzoyl-3-(2-pyrrolidinoethoxy)indole hydrochloride was determined according to the method described by R. Domenjoz in Archive für experimentelle Pathologie und Pharmakologie 215, 19–24 (1952). The test was carried out by narcotizing healthy cats of normal weight with a suitable narcotic. Doses of 40–60 mg./kg. of Numal "Roche" were applied interperitoneally to obtain a relatively superficial narcosis. A definite anti-tussive effect was determined at a dose of 1.0 mg./kg. in intravenous administration to the anaesthetized cats.

The anaesthesia-potentiating activity was determined as follows:

The compounds to be tested are administered to male and female mice weighing between 17 g. and 25 g. thirty minutes prior to the administration of the anaesthesia-potentiating 2-benzoyl-3-(2-pyrrolidinoethoxy) indole hydrochloride and 2-benzoyl-3-(2-pyrrolidinoethoxy)-5,6-methylenedioxy indole hydrochloride. The extent to which anaesthesia induced by a standard amount, i.e. a 0.4% solution of Estil (2-methoxy-4-allyl-phenoxy acetic acid N,N-diethyl amide) in 30% propyleneglycol, is prolonged by a known dose of the test compound. The standard amount of anaesthetic is 40 mg./kg. i.p. Anaesthetized mice remain in side position, the criterion for anaesthesia, for a certain amount of time which is recorded for each animal. The control animals received the standard amount of anaesthetic only; the test animals received the test compounds in aqueous solution by subcutaneous injection. The change in the duration of the anaesthetic effect is calculated in percent of the effect observed with the control group; the results are given in the following table.

|  | Dosages, mg./kg. | Difference, percent | Number of mice tested |
|---|---|---|---|
| 2-benzoyl-3-(2-pyrrolidinoethoxy)-indole hydrochloride. | 5 | More than +60. | 10 |
|  | 20 | More than +450. | 10 |
| 2-benzoyl-3-(2-pyrrolidinoethoxy)-5,6-methylenedioxy indole hydrochloride. | 0.5 | More than +40. | 20 |
|  | 2 | More than +100. | 20 |
|  | 5 | More than +150. | 20 |
|  | 20 | More than +500. | 10 |

2-benzoyl-3-(2-pyrrolidino ethoxy)indole hydrochloride was also tested for its tranquilizing activity in aggressive male mice weighing between 34 and 50 g. Male mice, after having been isolated in individual cages for 3 weeks are brought together pairwise for 1 minute per experiment choosing only mice that attack each other within 25 seconds. The dosage is determined in which 50% of the mice do not show aggression, called D.e. 50. The D.e. 50 for the above-mentioned compound is 3 mg./kg. s.c.

The compounds of the present invention may be used in warm-blooded animals, particularly mammals, as medicaments in the form of pharmaceutical compositions containing the compounds in admixture or conjunction with a pharmaceutical organic or inorganic, solid or liquid carrier for oral, rectal, or parenteral administration.

The total daily doses for animals vary from about 5 mg./kg. to about 50 mg./kg., preferably about 10 mg./kg. to 25 mg./kg. Daily dosages for patients can vary from about 1 mg./kg. to about 5 mg/kg. preferably from about 2 mg./kg. to about 3 mg./kg. The preferred route of administration is the oral route. Suitable compositions include, without limitation, tablets, capsules, powder solutions, suspensions, sustained release formulations and the like.

Typical of the compounds utilized in the present invention are the following:

2-benzoyl-3-(2-dimethylaminoethoxy)indole;
2-benzoyl-3-(2-diethylaminoethoxy)indole;
2-benzoyl-3-(3-diethylaminopropoxy)indole;
2-benzoyl-3-(2-pyrrolidinoethoxy)indole;
2-benzoyl-3-(2-piperidinoethoxy)indole;
2-benzoyl-3-(2-morpholinoethoxy)indole;
2-benzoyl-3-(2-pyrrolidinoethoxy)-5-methoxyindole;
2-(4-methylbenzoyl)-3-(2-pyrrolidinoethoxy)-5-methydindole;
2-(4-methoxybenzoyl)-3-(2-pyrrolidinoethoxy)indole;
2-(4-methoxybenzoyl)-3-(2-pyrrolidinoethoxy)-5-methylindole;
2-(4-ethoxybenzoyl)-3-(2-pyrrolidinoethoxy)indole;
2-(4-ethoxybenzoyl)-3-(2-pyrrolidinoethoxy)-5-methylindole;
2-(4-ethoxybenzoyl)-3-(2-pyrrolidinoethoxy)-6-methylindole;
2-benzoyl-3-(2-morpholinoethoxy)-5,6-dimethylindole;
2-benzoyl-3-(2-piperidinoethoxy)-5,6-dimethylindole;
2-benzoyl-3-[2-(1,2,3,6-tetrahydropyridino)ethoxy]-5,6-dimethylindole;
2-benzoyl-3-(2-pyrrolidinoethoxy)-5-chloroindole;
2-(4-chlorobenzoyl)-3-(2-piperidinoethoxy)indole;

2-benzoyl-3-(2-pyrrolidinoethoxy)-5,6-methylene-
dioxyindole;
2-benzoyl-3-(2-pyrrolidinoethoxy)-5-benzyloxyindole;
2-acetyl-3-(2-pyrrolidinoethoxy)indole;
2-(4-chlorobenzoyl)-3-(2-pyrrolidinoethoxy)indole;
2-benzoyl-3-(2-piperidinoethoxy)-5-methoxyindole;
2-(2,2-dimethylpropionyl)-3-(2-pyrrolidinoethoxy)
indole;
2-benzoyl-3-(2-pyrrolidinoethoxy)-5,6-dimethylindole;
2-benzoyl-3-(2-pyrrolidinoethoxy)-6-methoxyindole;
2-benzoyl-3-(2-pyrrolidinoethoxy)-5-hydroxyindole; and
2-benzoyl-3-(2-pyrrolidinoethoxy)-5-acetoxyindole.

To produce dosage units for oral administration which contain a compound of general Formula I or a pharmaceutically usable salt thereof as active substance, the active substance is mixed with, e.g. solid, pulverulent carrier substances such as lactose, saccharose, sorbitol and mannitol or starches such as potato starch, maize starch and amylopectin. Laminaria powder or citrus pulp powder can also be added. Cellulose derivatives or gelatine and also lubricants such as magnesium or calcium stearate or polyethylene glycols of waxy consistency (Carbowax) can be added for the production of tablets or capsule cores. The latter can be coated, e.g. with concentrated sugar solutions which can contain gum arabic, talcum and/or titanium dioxide or, however, they can be coated with a lacquer dissolved in easily volatile organic solvents or mixtures of solvents. Dyestuffs can be added to these coatings, e.g. to differentiate between varying contents of active substance. Soft gelatin capsules (closed, pearl shaped capsules) and other closed capsules consist of, e.g. a mixture of gelatine and glycerin and contain, for example, mixtures of the active substance with Carbowax, and hard gelatine capsules contain, e.g. granulates of the active substance with solid pulverulent carrier substances such as lactose, saccharose, sorbitol or mannitol; starch such as potato starch, maize starch or amylopectin; cellulose derivatives or gelatine as well as magnesium stearate or stearic acid.

Suppositories are used as dosage units for rectal administration. These consist of a mixture of the active substance with a neutral fatty foundation. Also gelatine capsules consisting of a mixture of the active substance with polyethylene glycols of waxy consistency (Carbowax) are suitable for rectal administration.

Syrups and suspensions for oral administration consist, e.g. of a solution which contains at least 2, at most, however, 20% by weight of active substance in addition to sugar and a mixture of ethanol, water, glycerin and also propylene glycol and, e.g. flavourings, saccharine and/or carboxymethyl cellulose (for suspensions).

Ampoules for parenteral administration by injection preferably contain a water soluble, pharmaceutically usable salt of an active substance according to the invention in a concentration of, preferably, 0.5–10%, if desired with suitable stabilising agents and/or buffer substances, in aqueous solution.

The following examples illustrate the production of typical forms for administration of the compounds according to the invention but they are by no means the only forms for administration.

Example 1

Prescription for the production of a syrup containing 0.5% (weight per volume) of a compound of general Formula I

|  | G. |
|---|---|
| Indole derivative of Formula I | 0.5 |
| Saccharine | 0.6 |
| Sugar | 3.0 |
| Glycerin | 5.0 |
| Distilled water | 10.0 |
| Flavouring | 0.1 |
| Ethanol 96%, ad 10.0 ml. | |

Sugar and saccharine are dissolved in hot distilled water. While it is cooling, water is added to the solution until it has the required weight and glycerin is added. The aqueous solution is then added to a solution of the active substance and flavouring in about 65 ml. of ethanol and then it is made up to 100 ml. of ethanol.

Example 2

250 g. of an indole derivative of Formula I and 175.8 g. of lactose and 169.7 g. of potato starch are mixed, the mixture is moistened with an alcoholic solution of 10 g. of stearic acid and granulated through a sieve. After drying, 160 g. of potato starch, 200 g. of talcum, 2.5 g. of magnesium stearate and 32 g. of colloidal silicon dioxide are mixed in and the mixture is pressed into 10,000 tablets each weighing 100 mg. and containing 25 mg. of active substance. If desired, the tablets can be grooved to enable better adaptation of the dosage instructions.

Example 3

A granulate is produced from 250 g. of an indole derivative of Formula I 175.9 g. of lactose and the alcoholic solution of 10 g. of stearic acid. After drying, the granulate is mixed with 56.6 g. of colloidal silicon dioxide, 165 g. of talcum, 20 g. of potato starch and 2.5 g. of magnesium stearate and 10,000 dragee (sugar-coated tablets) cores are pressed from the mixture. These are first coated with an alcoholic solution of 6 g. of shellac, then with a concentrated syrup made from 502.28 g. of crystallised saccharose, 10 g. of gum arabic, 0.22 g. of dyestuff and 1.50 g. of titanium dioxide, and then dried. The dragees obtained each weigh 120 mg. and contain 25 mg. of active substance, e.g. 2-(p-ethoxybenzoyl) - 3 - (2 - morpholinoethoxy)-5-methyl-indole.

Example 4

1.0 g. of 2-(benzoyl)-3-(2-pyrrolidino-ethoxy)-indole and 0.10 g. of ascorbic acid are dissolved in distilled water and the solution is diluted up to 100 ml. The solution obtained is used to fill ampoules each containing, e.g., 1 ml. which corresponds to a content of 10 mg. of active substance. The filled ampoules are then sterilsed by heating in the usual way.

Example 5

250 g. of 2-benzoyl-3-(2-pyrrolidinoethoxy)-5,6-methylenedioxy indole hydrochloride, 175.8 g. of lactose and 169.7 g. of potato starch are mixed; the mixture is moistened with an alcoholic solution of 10 g. of stearic acid and granuulated through a sieve. After drying, 160 g. of potato starch, 200 g. of talcum, 2.5 g. of magnesium stearate and 32 g. of colloidal silicon dioxide are mixed in and the mixture is pressed nto 100,000 tablets each weighing 100 mg. and containing 25 mg. of 2-benzoyl-3-(2-pyrrolidinoethoxy)-5,6 - methylenedioxy indole hydrochloride. If desired, the tablets can be grooved to enable better adaptation of the dosage instructions.

What is claimed is:

1. The method of treating pain in a mammal which comprises administering to said mammal an analgesically effective amount of a compound of the formula:

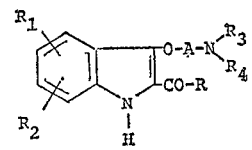

wherein

R represents lower alkyl, phenyl, or phenyl substituted by lower alkyl, lower alkoxy, fluorine, chlorine, or bromine;

$R_1$ and $R_2$ independently of each other represent hydrogen, lower alkyl, lower alkoxy, lower alkanoyloxy, phenylalkoxy with up to 9 carbon atoms, fluorine, chlorine, bromine, hydroxy or $R_1$ and $R_2$ taken together represent methylenedioxy;

A represents alkylene with up to 4 carbon atoms; and $R_3$ and $R_4$ each represent lower alkyl, or as $-NR_3R_4$ they represent pyrrolidino, piperidino, hexamethyleneimino, morpholino, lower dialkylmorpholino, or tetrahydropyridino or pharmaceutically acceptable acid addition salts thereof.

2. The method of treating conditions in mammals characterized by inflammation or edema which comprises administering to said mammal an effective amount of a compound of the formula:

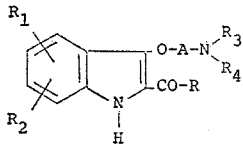

wherein

R represents lower alkyl, phenyl, or phenyl substituted by lower alkyl, lower alkoxy, fluorine, chlorine, or bromine;

$R_1$ and $R_2$ independently of each other represent hydrogen, lower alkyl, lower alkoxy, lower alkanoyloxy, phenylalkoxy with up to 9 carbon atoms, fluorine, chlorine, bromine, hydroxy or $R_1$ and $R_2$ taken together represent methylenedioxy;

A represents alkylene with up to 4 carbon atoms; and $R_3$ and $R_4$ each represent lower alkyl, or as $-NR_3R_4$ they represent pyrrolidino, piperidino, hexamethyleneimino, morpholino, lower dialkylmorpholino, or tetrahydropyridino or pharmaceutically acceptable acid addition salts thereof.

3. The method of producing a tranquilizing effect in a mammal which comprises administering to said mammal a tranquilizing amount of a copound of the formula:

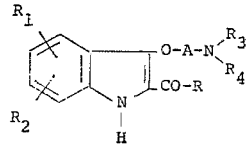

wherein

R represents lower alkyl, phenyl, or phenyl substituted by lower alkyl, lower alkoxy, fluorine, chlorine, or bromine;

$R_1$ and $R_2$ independently of each other represent hydrogen, lower alkyl, lower alkoxy, lower alkanoyloxy, phenylalkoxy with up to 9 carbon atoms, fluorine, chlorine, bromine, hydroxy or $R_1$ and $R_2$ taken together represent methylenedioxy;

A represents alkylene with up to 4 carbon atoms; and $R_3$ and $R_4$ each represent lower alkyl, or as $-NR_3R_4$ they represent pyrrolidino, piperidino, hexamethyleneimino, morpholino, lower dialkylmorpholino, or tetrahydropyridino or pharmaceutically acceptable acid addition salts thereof.

4. A pharmaceutical composition for the production of analgesic, tranquilizing, anti-inflammatory or anti-edema effects in a mammal which comprises in dosage unit form a pharmaceutical carrier and an amount of active ingredient sufficient to supply a daily dosage when administered in a daily dosage regimen from about 5 mg./kg. to about 50 mg./kg. of body weight, said active ingredient being a compound of the formula:

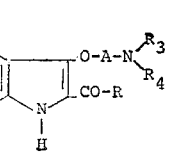

wherein

R represents lower alkyl, phenyl, or phenyl substituted by lower alkyl, lower alkoxy, fluorine, chlorine, or bromine;

$R_1$ and $R_2$ independently of each other represent hydrogen, lower alkyl, lower alkoxy, lower alkanoyloxy, phenylalkoxy with up to 9 carbon atoms, fluorine, chlorine, bromine, hydroxy or $R_1$ and $R_2$ taken together represent methylenedioxy;

A represents alkylene with up to 4 carbon atoms; and $R_3$ and $R_4$ each represent lower alkyl, or as $-NR_3R_4$ they represent pyrrolidino, piperidino, hexamethyleneimino, morpholino, lower dialkylmorpholino, or tetrahydropyridino or a pharmaceutically acceptable acid addition salt thereof.

5. A composition according to claim 4 wherein said compound is 2-benzoyl-3-(2-pyrrolidinoethoxy)indole.

6. A composition according to claim 4 wherein said compound is 2-benzoyl-3-(2-pyrrolidinoethoxy)-5,6-methylenedioxy indole.

7. A composition according to claim 4 wherein said compound is 2-benzoyl-3-(2-dimethylaminoethoxy)indole.

8. A composition according to claim 4 wherein said compound is 2-(4-ethoxybenzoyl) - 3 - (2 - pyrrolidinoethoxy)-5-methyl indole.

9. A composition according to claim 4 wherein said compound is 2 - (4 - methylbenzoyl) - (2 - pyrrolidinoethoxy)-5,6-dimethyl indole.

10. A composition according to claim 4 wherein said compound is 2 - (p - ethoxybenzoyl) - 3 - (2 - pyrrolidinoethoxy)indole.

11. A composition according to claim 4 wherein said compound is 2-benzoyl-3-(2-diethylaminoethoxy)indole.

12. A composition according to claim 4 wherein said compound is 2-benzoyl-3-(2 - pyrrolidinoethoxy) - 5,6-dimethyl indole.

13. A composition according to claim 4 wherein said compound is 2 - benzoyl - 3 - (2 - pyrrolidinoethoxy) - 5-hydroxy indole.

14. A composition according to claim 4 wherein said compound is 2-benzoyl-3-(2-pyrrolidinoethoxy)-5-acetoxy indole.

15. A composition according to claim 4 wherein said compound is 2 - benzoyl - 3 - (2-pyrrolidinoethoxy)-5-methoxy indole.

16. A composition according to claim 4 wherein said compound is 2-benzoyl - 3 - (2 - pyrrolidinoethoxy)indole hydrochloride.

17. A composition according to claim 4 wherein said compound is 2-benzoyl-3-(2-piperidinoethoxy)indole.

18. A composition according to claim 4 wherein said compound is 2-benzoyl - 3 - (2 - piperidinoethoxy) indole hydrochloride.

19. A composition according to claim 4 wherein said compound is 2-(4' - chlorobenzoyl) - 3 - (2 - pyrrolidinoethoxy)indole.

20. A composition according to claim 4 wherein said compound is 2-(4'-chlorobenzoyl)-3-(2-piperidinoethoxy) indole.

21. A composition according to claim 4 wherein said compound is 2-(4'-methoxybenzoyl) - 3 - (2 - pyrrolidinoethoxy)-5-methyl indole.

22. A composition according to claim 4 wherein said compound is 2-benzoyl-3-(3-diethylaminopropoxy)indole.

References Cited

UNITED STATES PATENTS 3,410,857   11/1968   Schoen et al. _____ 260—326.14

STANLEY J. FRIEDMAN, Primary Examiner

U.S. Cl. X.R.

424—244, 248, 263, 267

PO-1050
(5/69)

UNITED STATES PATENT OFFICE
CERTIFICATE OF CORRECTION

Patent No. 3,646,209                    Dated February 29, 1972

Inventor(s) Arne Elof Brandstrom et al

It is certified that error appears in the above-identified patent and that said Letters Patent are hereby corrected as shown below:

Column 8, claim 9, line 28, after "methylbenxoyl)", insert --- -3- ---; line 29, delete "-5,6-dimethyl", and insert --- -5-methyl ---.

Signed and sealed this 8th day of August 1972.

(SEAL)
Attest:

EDWARD M. FLETCHER, JR.          ROBERT GOTTSCHALK
Attesting Officer                Commissioner of Patents